United States Patent
Bridgwater et al.

(10) Patent No.: US 7,998,315 B2
(45) Date of Patent: Aug. 16, 2011

(54) BIOMASS PYROLYSIS

(75) Inventors: Anthony Bridgwater, Solihull (GB); Heiko Gerhauser, Nibbixwoud (NL); Astrid Effendi, Belfast (GB)

(73) Assignee: Aston University, Birmingham (GB)

( * ) Notice: Subject to any disclaimer, the term of this patent is extended or adjusted under 35 U.S.C. 154(b) by 425 days.

(21) Appl. No.: 12/369,407

(22) Filed: Feb. 11, 2009

(65) Prior Publication Data

US 2009/0227766 A1    Sep. 10, 2009

Related U.S. Application Data

(63) Continuation of application No. PCT/GB2007/002975, filed on Aug. 6, 2007.

(30) Foreign Application Priority Data

Aug. 16, 2006 (GB) .................................. 0616298.6

(51) Int. Cl.
*C10B 51/00* (2006.01)
*C10G 1/00* (2006.01)
*C10B 47/28* (2006.01)

(52) U.S. Cl. ............. 201/2.5; 201/28; 201/29; 585/240; 585/242

(58) Field of Classification Search .................... 201/2.5, 201/28, 29; 585/240, 242
See application file for complete search history.

(56) References Cited

U.S. PATENT DOCUMENTS

| 5,820,640 | A | 10/1998 | Ikura et al. |
| 6,844,420 | B1 | 1/2005 | Freel et al. |

FOREIGN PATENT DOCUMENTS

| EP | 0718392 A1 | 6/1996 |
| EP | 1311615 A1 | 8/2007 |
| WO | WO 01/02516 A1 | 1/2001 |
| WO | WO03/057800 | 7/2003 |
| WO | WO2006/119219 | 11/2006 |

OTHER PUBLICATIONS

Oasmaa, Anha et al., Fast pyrolysis of forestry residue and pine. 4. Improvement of the product quality by solvent addition, Energy and Fuels, vol. 18, No. 5, Sep. 2004, pp. 1578-1583.
Boucher, M. et al., Bio-oils obtained by vacuum pyrolysis of softwood bark as a liquid fuel for gas turbines. Part II: stability and ageing of bio-oil and its blends with methanol and a pyrolytic aqueous phase, Biomass Bioenergy: Biomanss and Bioenergy 2000 Elsevier Science Ltd., Exeter, Engl., vol. 19, No. 5, 2000 pp. 351-361.
Oasmaa, Anja, A guide to physical property characterization of biomass-derived fast pyrolysis liquids, VTT Publications, No. 450, Dec. 2001.
Bridgewater, A.V. et al., Fast Pyrolysis of Biomass: A handbook, vol. 2, 2002.
Partial International Search Report and Written Opinion of the International Searching Authority for PCT/GB2007/002975 dated Nov. 8, 2009.
Oasmaa, Anja et al. Quality improvement of pyrolysis liquid: effect of light volatiles on the stability of pyrolysis liquids, Energy and Fuels, vol. 19, 2005 pp. 2556-2561.
Home, Patrick et al. Catalytic coprocessing of biomass-derived pyrolysis vapours and methanol, J. Ana. App. Pyrolysis, 34 (1995) pp. 87-108.
Steinberg et al. Flash Pyrolysis of biomass with reactive and non-reactive gas, Biomass 9 (1986) pp. 293-315.

*Primary Examiner* — Nina Bhat
(74) *Attorney, Agent, or Firm* — Leason Ellis LLP

(57) ABSTRACT

A process for pyrolyzing biomass is provided. The process comprises providing biomass to a pyrolysis reactor to produce a vapor product and condensing said vapor product to produce a condensed product, wherein a phase separation suppression agent is added during said process so as to promote the formation of a single phase condensed product.

11 Claims, 1 Drawing Sheet

BIOMASS PYROLYSIS

CROSS REFERENCE TO RELATED APPLICATIONS

This is a U.S. continuation of International Patent Application No. PCT/GB2007/002975, with an international filing date of Aug. 6, 2007, now pending, which claims priority to United Kingdom Application No. 0616298.6, filed Aug. 16, 2006. The contents of each are hereby incorporated by reference in their entireties.

FIELD OF THE INVENTION

The present invention is concerned with pyrolysis of biomass. Particularly, but not exclusively, the present invention is concerned with a method of pyrolysis, and the final and intermediate products of such a method.

RELATED ART

It is known that resins can be produced from biomass (particularly wood, bark, etc.) using fast pyrolysis methods. Such methods are discussed in detail, for example, in U.S. Pat. No. 6,844,420. This document is concerned with the production of natural resins for the substitution of phenol formaldehyde resins and phenol urea formaldehyde resins. Such resins have particular applicability as glue binders in the production of man-made wood products, such as plywood and fibre board.

It is observed in U.S. Pat. No. 6,844,420 that natural lignins, which can be produced by pyrolysis from biomass, are structurally similar to phenol formaldehyde synthetic resins. Lignin is a random network polymer with a variety of linkages, based on phenyl propane units. In U.S. Pat. No. 6,844,420, biomass (typically particulate red maple feedstock) is supplied to an entrained-bed tubular reactor for fast pyrolysis. Char is removed from the resultant product vapour, the product vapour then being condensed to a liquid product (typically called a "bio-oil") within one or more recovery units, e.g. condenser units. Next, the liquid product is further treated using distillation/evaporation. The purpose of this additional step is primarily to drive off water from the liquid product in order to provide a controlled degree of cross-linking or polymerisation in the liquid product. The distillation/evaporation step also reduces the amount of non-resin components including odorous components and acids.

The quality improvement of pyrolysis liquid by addition of alcohol is disclosed by Oasmaa, A. et al, in *Energy and Fuels* 2005, 19, 2556-2561. The viscosity, heating value and flash point of bio-oil are improved by concentration of a pyrolysis liquid and subsequent addition of an alcohol, with or without water, to the concentrate. The concentration step, which removes a large proportion of the water in the pyrolysis liquid, also removes part of the acids in the product mixture and removes the unpleasant odour of pyrolysis.

SUMMARY OF THE INVENTION

The present inventors have realised that a specific problem with the pyrolysis of biomass (especially, but not exclusively, lignin-containing biomass) is that the condensed vapour (bio-oil) from the pyrolysis reactor tends to suffer from phase separation. Bio-oil is a complex mixture primarily of water, hydrophilic oxygenated organic compounds and higher molecular weight lignin fragments. The inventors consider that a water content above a certain level, e.g. 30-40% by mass can lead to phase separation into two phases, an aqueous phase dominated by water and small hydrophilic organic compounds and an organic phase which contains most of the phenolic lignin-derived fragments. This phase separation is undesirable, since the organic phase is more difficult to handle than a single phase bio-oil. Furthermore, as there is a higher concentration of lignin fragments in the organic phase than there would be in the single phase bio-oil, condensation reactions between the lignin fragments occur at a greater rate, leading to a loss of reactivity of the organic phase, and a reduction in its usefulness as a phenol substituting group in phenol formaldehyde resin formulations. Still further, the aldehydes in the single phase bio-oil are largely lost from the organic phase if phase separation is allowed to occur, and so cannot contribute to the replacement of formaldehyde in phenol formaldehyde resin formulations.

The present invention addresses at least one of these problems, preferably reducing, ameliorating or avoiding at least one of these problems.

Accordingly, in a general aspect, the present invention provides a non phase-separated bio-oil.

Preferably, in a first aspect, the present invention provides a process for pyrolysis of biomass, including:
providing biomass to a pyrolysis reactor to produce a vapour product; and
condensing said vapour product to produce a condensed product
wherein a phase separation suppression agent is added during said process so as to suppress separation of phases in the condensed product.

In a second aspect, the present invention provides a process for pyrolysis of biomass, the process comprising:
providing biomass to a pyrolysis reactor to produce a vapour product; and
condensing said vapour product to produce a condensed product,
wherein the vapour product is condensed using a coolant that is a solvent for at least one component of the product, and the coolant is separable with the at least one component from the condensed product.

Preferably, the condensed product is substantially single phase. The phrase "single phase" in this technical field in reference to the condensed product means that the product is not bi-phasic or multi-phase. As such, emulsions, particularly micro-emulsions, suspensions and sols are encompassed within the meaning of the phrase "single phase". Thus, the condensed product does not have two or more distinct and separate phases, even though, at below the microscopic level, more than one phase may be present.

The phase separation suppression agent suppresses separation of phases in the condensed product. The agent can be added to reduce the rate of phase separation in the condensed single phase condensed product. The agent can be added to produce a condensed product that does not separate for preferably at least one week, two weeks, one month, or one year. Alternatively, the agent can be added to produce a condensed product that remains unseparated indefinitely.

The pyrolysis reactor may comprise an ablative, fluidised bed, transported bed, rotating cone, circulating fluid bed or cyclonic reactor. Preferably the biomass is provided to a fluidised bed reactor.

Typically, in the pyrolysis of biomass, char is produced. The process preferably includes removal of at least some of the char from the vapour product using a char-removal apparatus. Typical suitable apparatus use fluid mechanical techniques such as cyclonic processing, or electrostatic techniques such as electrostatic precipitation, or filtration techniques such as candle or baghouse filters, or demisters, separately or in any combination, in order to separate the char particles from the vapour product. It is preferred that the char removal stage takes place prior to the condensation stage.

Preferably, the phase separation suppression agent is added before or during condensation of the vapour product. It is particularly preferred that the phase separation suppression agent itself provides or assists in the condensation of the vapour product. For example, the condensation may be caused by direct contact between the vapour product and a coolant. Preferably, the coolant includes the phase separation suppression agent. Before condensation of the vapour product takes place, the coolant is at a lower temperature than the vapour product, so as to promote condensation of the vapour product.

Additionally or alternatively, the phase separation suppression agent may be added to the condensed product after condensation (or at least after condensation has been initiated). However, adding the phase separation suppression agent only in this way is not preferred at present, since a greater addition of single-phase promotion agent is typically necessary to achieve a similar result as achieved by adding said agent during condensation.

The coolant is typically a liquid, preferably having a main component that is itself immiscible with bio-oil, such as a hydrocarbon. Preferably the coolant comprises an octane or an isoparaffin, for example, an ISOPAR (RTM) solvent such as ISOPAR V (Exxon Mobil Corporation). Of course, if this main component is immiscible with the condensed product, then this does not necessarily prevent the condensed product from being single phase—it is simply a single phase condensed product with another phase (the main component of the coolant).

The coolant may be recovered from the pyrolysis mixture. When the product mixture is collected the coolant can be separated from the bio-oil using standard processing techniques, and recycled.

The inventors have established that the use of the preferred coolants to condense the pyrolysis mixture may be selected so as not to have an influence on the final bio-oil composition, other than an influence that the phase separation suppression agent may have, when also functioning as a coolant (at least in part).

Alternatively, the coolant may have a bio-oil as a main component. The bio-oil of the coolant will typically be miscible with the condensed bio-oil product.

Alternatively, the coolant may be selected so as to have an influence on the final bio-oil composition. The inventors have found that the coolant can be used to extract components of the bio-oil that contribute to phase separation. The coolant is therefore a solvent for these components of the bio-oil. For example, a coolant composed predominantly of hydrocarbons may be used to extract hydrophobic or less oxygenated compounds, such as $C_{10-30}$ waxy hydrocarbons, from the bio-oil. The coolant may be used to extract one or more of the following: fatty acids (preferably $C_{12-32}$ fatty acids), hydroxy fatty acids (preferably ω-hydroxy fatty acids, preferably $C_{12-30}$ (ω-hydroxy fatty acids), dicarboxylic acids (preferably $C_{16-28}$ dicarboxylic acids), fatty alcohols (preferably $C_{16-30}$ fatty alcohols), resin acids (preferably abietic acid), sterols (preferably β-sitosterol), and triterpenoids (preferably betullnol).

The coolant may be recycled after extraction and condensation of the bio-oil. It is preferred that the recycled coolant is not saturated in components extracted from the bio-oil. In one embodiment, the quantity of coolant is sufficient to ensure the coolant will not become saturated during the pyrolysis run. In an alternative embodiment, the extracted components in the coolant can be removed during the recycling process, either continuously or as required.

The compounds extracted from the bio-oil by the coolant may have commercial value. These compounds may be recovered from the coolant by standard separation techniques. Preferably, the compounds are separated by distillation.

The coolant may be used to selectively remove components from the bio-oil. The coolant may also be used to extract components from the bio-oil whilst selectively retaining other components in the bio-oil. The solvent characteristics of the coolant can be 'tuned' by the appropriate mixture of selected solvent compounds. The identity and relative quantities of the compounds required will be apparent to one of skill in the art of solute extraction.

The phase separation suppression agent may be added to the coolant prior to use. Alternatively, the phase separation suppression agent may be added independently of the coolant.

Preferably, the phase separation suppression agent comprises an emulsifier for the condensed product. The emulsifier promotes the formation of a single-phase condensed product. As defined above, the single-phase condensed product may comprise below the microscopic level several phases. Thus, the single-phase condensed product may comprise a dispersion of one medium in another medium, for example, a dispersion of water in an organic phase. The emulsifier is capable of promoting the formation of an emulsion, and additionally or alternatively, is capable of stabilising an unstable single-phase condensed product.

The emulsifier may comprise a surfactant or a lyophilic sol.

Alternatively or additionally, the phase separation suppression agent is or includes an alcohol, preferably an alkyl alcohol, preferably methanol, ethanol or 2-propanol, most preferably ethanol. Typically at least some of the alcohol added in the process set out above reacts with reactive constituents of the product before those constituents are themselves consumed by condensation reactions (which produce water as a by-product) which could otherwise lead to high molecular weight compounds. It is believed that the alcohol reacts with components in the bio-oil to form esters, acetals and hemiacetals. In particular, the alcohol is believed to react with carboxylic acids to give esters. This process reduces the quantity of odorous compounds in the bio-oil and also reduces the acidity of the bio-oil. Without wishing to be bound by theory, reaction of the alcohol with the reactive constituents of the product is believed to yield products that are themselves capable of acting as phase separation suppression agents.

Alternatively or additionally, the phase separation suppression agent is or includes an amine, an aldehyde, a thiol, a ketone, or any organic compound that reacts to suppress phase separation.

Without wishing to be bound by theory, the lignin-derived fragments of the bio-oil are thought to be held as a microsuspension or emulsion and the phase separation suppression agent is believed to promote the emulsification process as well as suppressing phase separation.

The formation of a single-phase bio-oil by addition of a phase separation suppression agent has the effect of reducing the concentration of reactive compounds compared to the concentration of these compounds within the organic phase of a bi-phasic or multi-phase bio-oil product. The inventors consider that as a consequence the rate of reaction of these compounds is reduced. The reactive compounds in the bio-oil are thought to participate in condensation reactions which produce water. Too much water may lead to phase-separation of the bio-oil. Reducing the rate of reaction is thought to reduce the amount of water produced over time, thereby reducing the likelihood of phase separation during later processing and storage stages.

Additionally or alternatively, at least some of the phase separation suppression agent does not react with the constituents of the product. In this case, the phase separation suppression agent may assist in preventing phase separation via physical processes. The inventors have found that excess phase separation suppression agent reduces the viscosity of the bio-oil. Bio-oils with reduced viscosity may be more manageable in later processing stages. The inventors have also found that addition of a phase separation suppression agent yields a product that is less likely to foul the pyrolysis system.

The amount of excess phase separation suppression agent defined in terms of proportion in the condensed product is preferably at least 0.01 wt %, 1 wt %, 2 wt %, or 4 wt %. The amount of excess phase separation suppression agent defined in terms of proportion in the condensed product is preferably at most 40 wt %, 30 wt %, 25 wt %, 20 wt %, 15 wt %, or 10 wt %.

The above upper and lower amounts are combinable in any combination.

The biomass feedstock used in the process may be hardwood or softwood, wood bark, grass or agricultural residues. Preferably, the biomass feedstock used in the process has a high lignin content. For example, wood bark has a high lignin content. The lignin content in the biomass feedstock is preferably at least 5 wt %, 10 wt %, 15 wt %, or 20 wt %. The lignin content in the biomass feedstock is preferably at most 45 wt %, 40 wt%, or 35 wt %.

The above upper and lower amounts are combinable in any combination.

The organic yield from the pyrolysis process has been found not to have been reduced by the use of a phase separation suppression agent. The inventors have found that the recovery of a single phase pyrolysis product is easier compared to a bi-phasic or tri-phasic pyrolysis product. Where the coolant is used to extract components from the bio-oil that contribute to phase separation, the combined organic yield (the yield of organic material in the bio-oil and recovered from the coolant), is not reduced by the use of a phase separation suppression agent.

The inventors have found that the organic yield for the condensed pyrolysis product is typically at least 25 wt % when the phase separation suppression agent is used in the condensing process. For wood bark, the organic yield may be at least 40 wt % and the organic yield may be at least 60 wt % for wood. The organic yield represents all the organic compounds in the liquid phase excluding water and including lignin derived material as well as water soluble organic compounds.

In a third aspect, the present invention provides a single phase biomass pyrolysis condensation product.

The single phase biomass pyrolysis condensation product typically comprises water, phase separation suppression agent, and organic components. Preferably, the components of the product may be present in the following amounts: water 10-50 wt %, phase separation suppression agent 1-40 wt %, and 50-85 wt % organics.

Optionally, the condensation product is obtained or obtainable by the process according to the first aspect.

Preferred and/or optional features of any aspect may be applied to any other aspect in any combination or sub-combination, unless the context demands otherwise.

BRIEF DESCRIPTION OF THE DRAWINGS

Embodiments of the invention will now be described, by way of example, with reference to the drawings, in which.

DETAILED DESCRIPTION OF PREFERRED EMBODIMENTS

Figure 1:
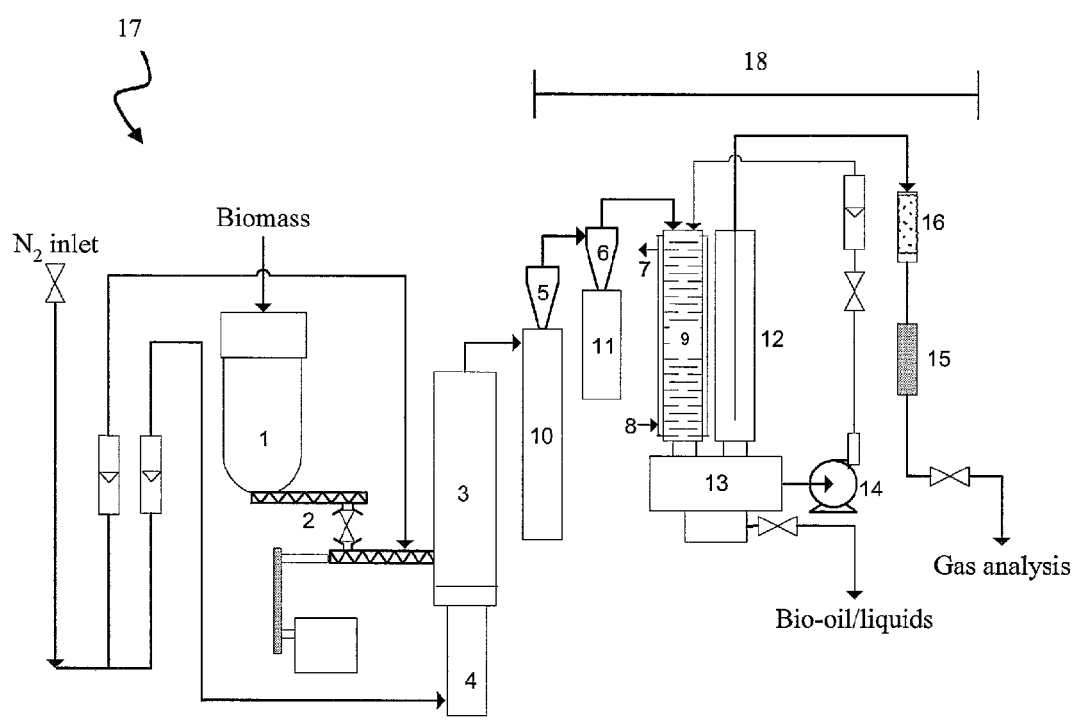
FIG. 1 is a schematic representation of a pyrolysis system for use in performing the process according to the present invention.

FIG. 1 shows a schematic representation of a pyrolysis system 17 for use in performing the process according to the present invention. The pyrolysis system includes a sealable feed container 1 which supplies biomass through a screw feeder 2 to the reactor 3. Preferably the screw feeder 2 is capable of providing a continuous feed to the reactor 3. Nitrogen gas is supplied to the reactor through a heater 4. Heat to the reactor 3, for example a fluid bed reactor, is provided by the heater 4. Nitrogen gas is also supplied to the screw feeder 2. The supply rate of the nitrogen is adjustable by flow control valves 19 and 20.

The conditions suitable for pyrolysing the biomass feedstock depend on the type of reactor and the nature of the feedstock, amongst others. Such conditions are well known to those of skill in the art of pyrolysis.

In use, the reactor 3 is purged with nitrogen to provide a non-reactive atmosphere to prevent unwanted oxidation of the biomass feedstock. The reaction vessel is brought to the required reaction temperature by the heater 4 (e.g. 500° C.). The biomass is then fed into the reaction vessel using the screw feeder 2 with gravity feed into the reactor. The pyrolysis gases and vapour exit to the product collection system 18.

A slight positive pressure is generated by the formation of pyrolysis gases and vapour in the reactor 3 and this forces the pyrolysis products out of the reaction vessel and onto the collection system 18. The skilled person will recognise that in some reactors, for example fluidised bed reactors, the pyrolysis products are also removed by the fluidising gas. In the collection system 18 char is separated from the gases and vapours by the vortex generated in a series of cyclone char collectors 5 and 6. Each cyclone char collector is provided with a char pot 10 and 11 to collect char removed from the pyrolysis vapour and gases. Alternatively, the char may be removed using a hot vapour filter.

After the char removal step, the vapour is taken on to a condensing column 9 where the gaseous pyrolytic product is condensed. In the condensing column 9 the pyrolysis vapour may be condensed using a coolant as part of a 'quench' step. Typically, the coolant is a liquid. The column may also be cooled by a circulating water system 7 and 8. Condensed materials are collected in a tank 13 beneath the column 9.

The phase separation suppression agent may be added to the condensing column 9 either with the coolant or separately from the coolant. Alternatively, the agent may be added to the condensed bio-oil in the tank 13. The bio-oil may be taken from the tank 13 for analysis, testing and storage.

Suitable coolants comprise octane and isoparaffin. Alternatively, bio-oil itself may be used as a coolant in the condensing column. The coolant is at a lower temperature than the pyrolysis vapour.

Uncondensed gases are passed into an electrostatic precipitator chamber 12. Material precipitated in this device is collected in the tank 13. The gases remaining after the electrostatic precipitation step (e.g. CO, $CO_2$, $CH_4$, $H_2$ and higher hydrocarbons) are passed on through a dry ice condenser 16, and then a cotton filter 15. The gas may then be analysed. The gases are then vented, typically via a gas flow meter.

The bio-oil tank 13 is provided with a pump 14 so that collected coolant may be returned to the condensing column 9.

EXAMPLES

Bark with an ash content of 13 wt % (dry basis) was fed into a fluidised bed fast pyrolysis reactor with a nominal capacity of 1 kg/h. The feedstock was pyrolysed in the reactor at 500° C. and a phase separated oil was obtained after removal of the quench liquid from the pyrolysis product. The average molecular weight of the organics dominated phase was 696 g/mol. The water content of this phase was 3 wt %, with a pH of 3.5. The organic yield was 42%.

Using the same bark and a fluidised bed fast pyrolysis system with a nominal capacity of 150 g/h and a simple condenser, the feedstock was pyrolysed at 570° C. and a phase separated oil was obtained after condensation. The average molecular weight of the organics dominated phase was 467 g/mol. The water content of the phase was 10 wt %, with a pH of 3.8. The organic yield was 40%. After storage for a year, ethanol was added to the phase separated oil. A single phase oil was obtained when the ethanol content reached approximately 20 wt %. At this stage small tarry globules remained in the product oil and these globules did not break up into microscopic droplets or dissolve upon subsequent addition of ethanol.

In three separate experiments, bark with an ash content of 13 wt % (dry basis) was pyrolysed at 500° C. in a fluidised bed fast pyrolysis system with a nominal capacity of 5 kg/h. The pyrolysis vapour was quenched with Isopar V (RTM) mixed with ethanol. The amount of ethanol mixed with the quench liquid differed between experiments. The amount of ethanol was 4 wt %, 10 wt % and 25 wt % in proportion to the condensed product for the respective experiments. The condensed product obtained was a single phase oil in each case.

The average molecular weight of the single phase oil with 4 wt % ethanol was 561 g/mol. The water content of the phase was 27 wt %, with a pH of 3.4. The organic yield was 41%.

The average molecular weight of the single phase oil with 10 wt % ethanol was 493 g/mol. The water content of the phase was 21 wt %, with a pH of 3.9. The organic yield was 45%. Water was added to the single phase oil, yielding a separated oil product only when the water content reached approximately 40 wt %.

The average molecular weight of the single phase oil with 25 wt % ethanol was 507 g/mol. The water content of the phase was 22 wt %, with a pH of 4.1. The organic yield was 44%.

For the three experiments, the ratio of inert fluidising gas to biomass feedstock was approximately 5:1.

Approximately 85-90 wt % of the liquid yield was collected from the quench column and an electrostatic precipitator. The remainder of the liquid yield was collected from an efficient heat exchanger operating at 0° C. The water content of the fraction collected from the heat exchanger was approximately 60 wt % to 70 wt %.

A rotating cone fast pyrolysis system was used to pyrolyse 1,800 kg of partially dried biomass at 500° C. The pyrolysis vapour was quenched with bio oil (200 kg) mixed with ethanol (100 kg). The pyrolysis product was initially a single phase bio oil despite the 'wet' feedstock. The yield of bio oil was 1,000 kg. The ethanol content in the bio oil product was approximately 5 wt %. The bio oil was stored outside for several weeks at temperatures down to −10° C. after which the single phase bio oil separated. The resultant organics dominated phase had a water content of 20 wt %. The resultant aqueous phase had a water content of 72 wt %. Subsequent addition of ethanol to the phase separated oil gave a single phase product once the ethanol content reached approximately 20 wt %. Small tarry globules remained in the product oil and these globules did not dissolve and were not broken up into microscopic droplets upon addition of the ethanol.

The invention claimed is:

1. A process for pyrolysis of biomass, the process comprising:
   providing biomass to a pyrolysis reactor to produce a vapour product; and
   condensing said vapour product to produce a condensed product using a coolant that is a solvent for at least one component of the product, the coolant being separable with the at least one component from the condensed product,
   wherein a phase separation suppression agent is added before or during condensation so as to promote the formation of a single phase condensed product.

2. A process according to claim 1 wherein the coolant has a main component that is immiscible with the condensed product.

3. A process according to claim 1 wherein the phase separation suppression agent comprises an alcohol.

4. A process according to claim 1 wherein the phase separation suppression agent comprises an alcohol selected from the group consisting of methanol, ethanol and 2-propanol.

5. A process according to claim 1 wherein the amount of phase separation suppression agent is in the range 0.01 wt % to 40 wt % in proportion to the condensed product.

6. A process according to claim 1 wherein the lignin content in the biomass feedstock is in the range 5 wt % to 45 wt %.

7. A process according to claim 1 wherein the biomass feedstock includes wood bark.

8. A process according to claim 1 wherein the coolant comprises a hydrocarbon.

9. A process according to claim 8 wherein the hydrocarbon is isoparaffin or octane.

10. A process according to claim 8 wherein the hydrocarbon is a solvent for hydrophobic components of the product.

11. A process according to claim 8 wherein the hydrocarbon is a solvent for $C_{10-30}$ waxy hydrocarbons of the product.

* * * * *